United States Patent [19]

Aga

[11] Patent Number: 4,839,533
[45] Date of Patent: Jun. 13, 1989

[54] REMOTE SAFETY SWITCH

[76] Inventor: Steven M. Aga, 6337 W. Ocotillo Rd., Glendale, Ariz. 85301

[21] Appl. No.: 934,353

[22] Filed: Nov. 24, 1986

[51] Int. Cl.$^4$ .............................................. H01H 3/14
[52] U.S. Cl. ................................ 307/140; 192/129 A; 200/86.5; 307/115
[58] Field of Search ................. 192/129 A; 307/140, 307/110–120; 219/327, 200

[56] References Cited

U.S. PATENT DOCUMENTS

| | | | |
|---|---|---|---|
| 2,111,311 | 3/1938 | Child | 200/153 |
| 2,313,166 | 3/1943 | Nicholas | 200/153 |
| 2,944,120 | 7/1960 | Ruben | 200/5 |
| 4,259,567 | 3/1981 | Moore et al. | 219/327 |
| 4,283,612 | 8/1981 | Richards | 200/334 |
| 4,359,615 | 11/1982 | Meyerhoefer | 200/42 |
| 4,460,818 | 7/1984 | Anetsberger | 219/200 |
| 4,487,305 | 12/1984 | Wagner | 74/512 |
| 4,535,254 | 8/1985 | Khatri | 307/38 |

Primary Examiner—Bernard Roskoski
Attorney, Agent, or Firm—LaValle D. Ptak

[57] ABSTRACT

A foot operated safety switch, preferably including an electronic control reset circuit, is connected between a source of electrical current and the power cord of an electrically operated device having an on/off switch on it. The safety switch operates as an off-only device and cannot be used to turn on the device once it has been operated to turn the device off. To reoperate the device, the on/off switch on the device first must be turned off and then turned backon. This reset necessity also is incorporated into the system to prevent the device from being automatically turned back on after it has been turned off by a power failure.

7 Claims, 2 Drawing Sheets

REMOTE SAFETY SWITCH

BACKGROUND

Remotely located safety switches and "dead-man's" switches have been used on a variety of tools and machines for the purpose of shutting off such tools and machines in the event of an accident or incapacitation of the equipment operator. Typical "dead-man's" switches include throttle controls in the form of handgrips which must be squeezed during operation of the throttle. In the event the operator becomes incapacitated, the squeezing ceases; and the throttle no longer is operated. Other types of secondary controls for effecting a similar purpose also have been developed and generally operate in parallel with or in conjunction with a normal on/off switch control or a throttle control to turn off the machine or turn off the throttle in the event of a malfunction or incapacitation of the operator.

Another type of safety switch is in the form of a foot operated switch. Typical switches of the type are disclosed in the patents to Ruben U.S. Pat. No. 2,944,120; Nicholas U.S. Pat. No. 2,313,166; and Child U.S. Pat. No. 2,111,311. The patents to Child and Nicholas simply are directed to foot operated power switches which are spring biased to be normally "off". These switches are substantially standard single-pole, double-throw electrical switches and are used as the main power switch to turn on or to turn off the power to the tool or the device to which they are connected.

The device of the patent to Ruben is similar to the devices of Child and Nicholas; but Ruben includes an extra safety feature, inasmuch as the system of Ruben requires a first depression and release of the switch to set the circuit for operation followed by a subsequent depression of the switch to initiate and continue operation. Upon a second release of the switch, the system is turned off. This is done to prevent accidental start-up from the "off" status of the system controlled by the switch. The foot switch of Ruben itself, however, is the primary on/off switch for the system; and this switch, as in Child and Nicholas, is used to control turning on of the system as well as turning the system off.

The patent to Khatri U.S. Pat. No. 4,535,254 discloses a touch-operated power control switch device with indicators. While this device electronically is considerably more sophisticated than the systems of Ruben, Nicholas and Child, Khatri also basically acts as a simple on/off switching system for controlling the turning on and turning off of power to a load.

Another patent directed to a press machine with a foot operated switch control is the patent to Richards U.S. Pat. No. 4,283,612. In Richards, the switch functions as a "dead-man's" switch where the foot switch must be continuously depressed in order to operate the press. Additional proximity switches are employed to keep the operator at a safe distance from the tool. If the foot operated switch is not depressed, the tool is turned off. Subsequent depression of the foot operated switch, without changing any of the other controls or switch settings, reactivates or turns back on the power for the press.

The patent to Meyerhoefer U.S. Pat. No. 4,359,615 discloses a safety interlock electro-mechanical switch in the form of a "key" to prevent unauthorized operation of a tool or electrical device such as a table saw. The tool cannot be turned on until the special key is inserted into an actuator on the switch to permit the operation of the power switch. With the key in place, however, the power saw or other tool of Meyerhoefer is operated in a conventional manner and does not include any safety switch interlock or "dead-man's" switch to turn it off in the event of a tool malfunction or incapacitation of the operator.

It is desirable to provide a safety switch for electrical devices such as power tools and machines of all types which quickly and reliably turns off the tool or machine from a remote location irrespective of the location of the main on/off power switch for the tool or machine. It further is desirable to provide a remote emergency cut-off switch which operates as an "off-only" safety device which cannot be used to turn back on the tool or machine it controls until it is reset by turning off the tool and then turning the tool back on by means of the conventional main power supply switch.

SUMMARY OF THE INVENTION

It is an object of this invention to provide an improved safety control switch for electrical devices.

It is an additional object of this invention to provide an improved remote emergency cut-off switch for power tools and machines.

It is another object of this invention to provide an improved remote emergency off-only, cut-off switch for power tools and machines.

It is a further object of this invention to provide a remote foot-activated, electronic, emergency, off-only, cut-off switch for power tools and machines.

It is yet another object of this invention to provide a remote foot-activated, electronic, emergency cut-off switch located between the power supply connection for the tool and an electrical source, in which the cut-off switch is used as an off-only switch incapable of turning on the tool or machine controlled by it.

In accordance with a preferred embodiment of this invention, a safety switch system is provided for a power operated device having an on/off switch for connecting and disconnecting the device from a source of power. The safety switch has first and second states of operation and is connected in series between the source of power and the power supply connection for the on/off switch of the device to turn off power from the source of power to the device in the first state of operation of the safety switch, and to permit power from the source of power to be supplied to the device when the safety switch is in its second state of operation. A reset circuit is responsive to the condition of operation of the on/off switch and is coupled with the safety switch to prevent the resupplying of power from the source of power to the device when the safety switch is operated from its first state of operation to its second state of operation until the on/off switch is subsequently operated from its off position to its on position. Consequently, once the safety switch is operated, the on/off switch first must be switched from its "on" position to its off position and then back again to resume operation of the device.

DETAILED DESCRIPTION

Figure 1:
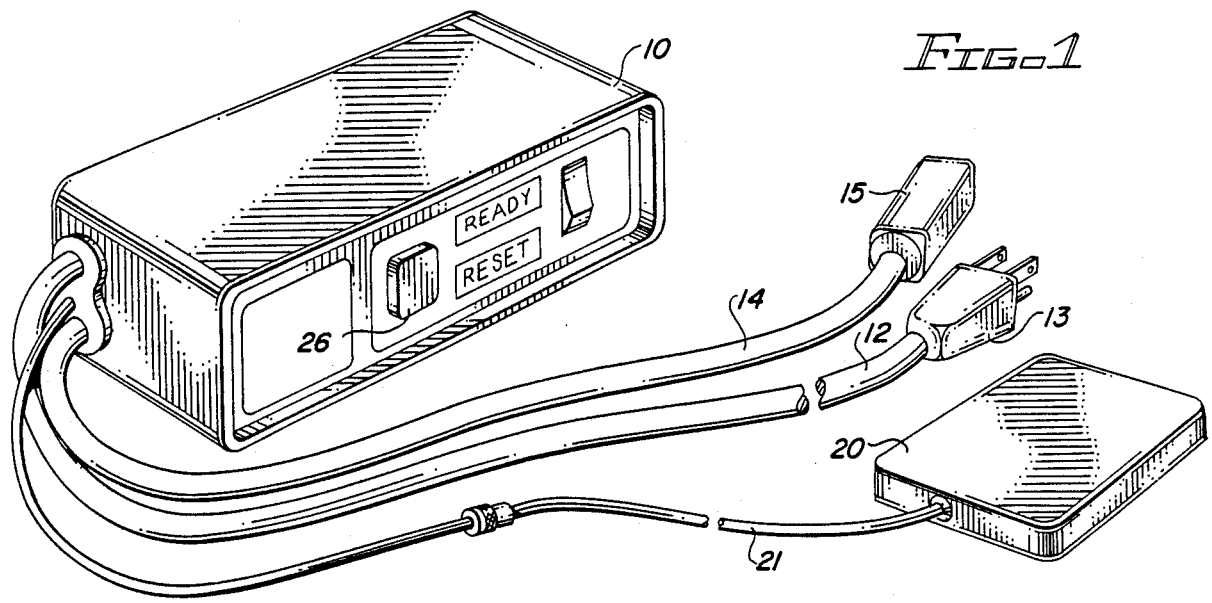
FIG. 1 is a perspective view of the housing and interconnection cords of a preferred embodiment of the invention.

Reference now should be made to the drawings in which the same or similar components have been given the same reference numbers throughout the different figures. FIG. 1 is an illustration of the basic components of a remote foot-activated electronic emergency cut-off switch system for machine tools and the like. The system itself preferably is housed in a high impact plastic housing 10, designed as a dustproof, solvent-resistant, and shock-resistant housing. The housing 10 includes the control circuitry for the cut-off switch to permit or block the flow of electrical power through a power supply cord 12 having a male connector 13 for connection to a suitable source of alternating current power, such as the household power supply available at conventional wall outlets. This constitutes the power input to the switch system located within the housing 10. The power output from the system is supplied over a cord 14 which terminates in a female plug 15 for connection to the male plug (not shown) of a machine tool or power tool to be controlled by the system. In a typical system, the remotely activated switch is a foot-operated switch housed in a low profile pad 20 interconnected with the circuitry in the housing 10 by means of a cable 21. The device shown in FIG. 1 typically is used as a safety off-only switch for a variety of different tools such as table, band, radial, and reciprocating saws; shapers, sanders, jointers, planers; lathes, mills, drill presses, tappers, grinders; various metal forming equipment including slitters, rolls, brakes, and shears; material handling equipment such as conveyors and rotary tables; custom machine tools; and some portable power tools where the switches are not readily accessible. The type of tool or machine to be controlled is not important. The system of FIG. 1 may be used with all types of tools and machines where an emergency safety cut-off which may be quickly and reliably operated is desired.

Figure 2:
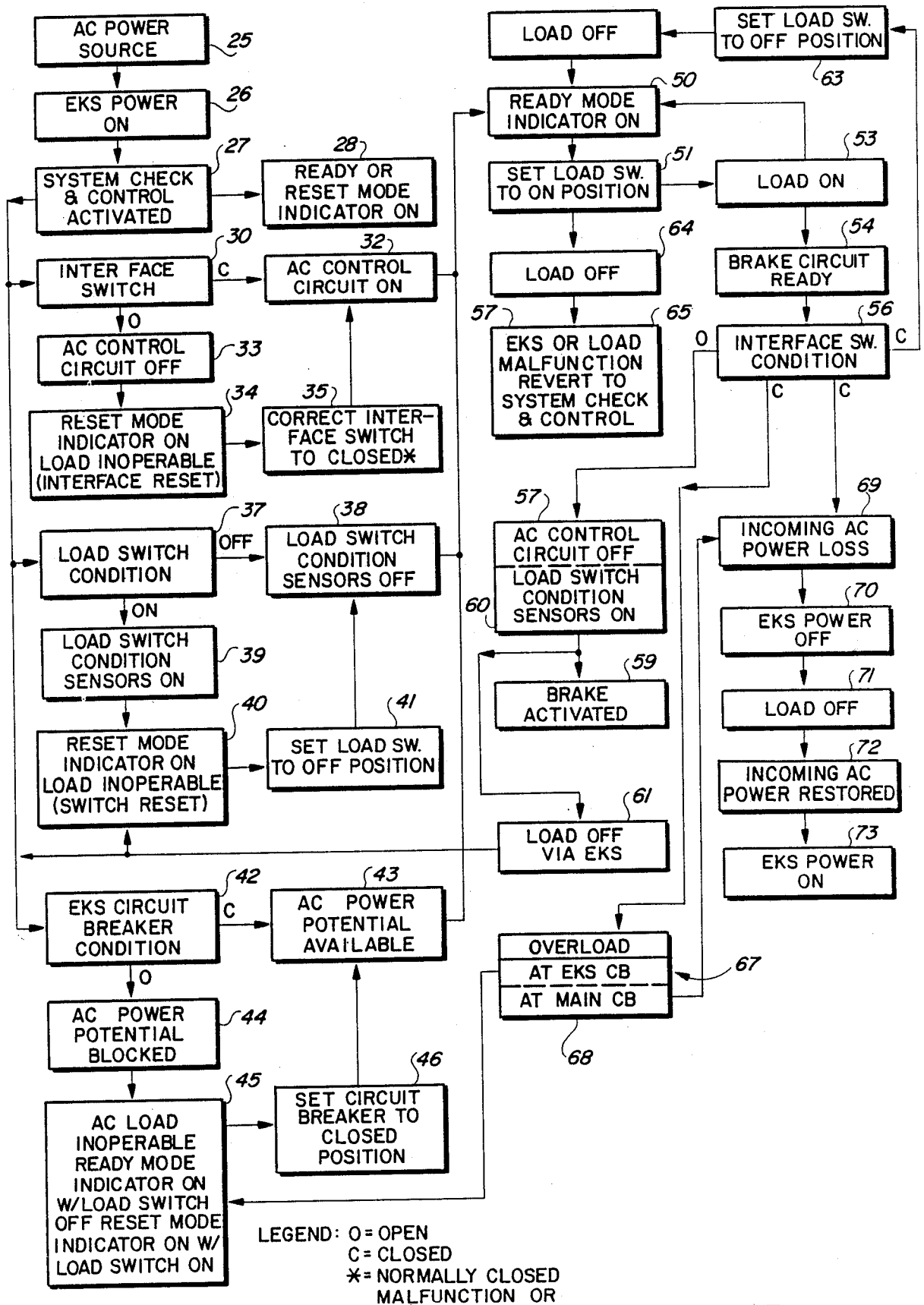
FIG. 2 is an operating flow diagram of the system of a preferred embodiment of the invention.

A preferred embodiment of the system is operated in accordance with the flow diagram shown in FIG. 2. In FIG. 2, the system which is depicted in FIG. 1 is referred to as an electronic kick switch (EKS) since one of the preferred forms of the invention is to use it as a foot operated "kick switch" to turn off the machine or tool with which the device is used. Referring now to FIG. 2 in conjunction with FIG. 1, the machine or tool power cord or connection is plugged into 15 (FIG. 1), the plug 13 (FIG. 1) is connected to an AC power source (25) and the power switch 26 of the safety switch system is turned on. When this occurs, the system check and control circuitry (27) is activated simultaneously along with an appropriate mode indicator (28) (in the form of an indicator light or lights) which is turned on to provide an indication of the conditions which are detected by the system check and control (27). If an interface switch 30 (the safety cut-off switch) is closed at this time, an AC control circuit (32) is turned on. On the other hand, if the interface switch (30) is open, the AC control circuit is off as indicated (33). Under this condition of operation, interface reset, an indication (34) is provided by the reset mode indicator that the load is inoperable; and it is necessary to correct the interface switch to its closed condition (35) so that the AC control circuit "on" condition 32 is established.

Again, at the same time, if the load switch (the main on/off switch for the tool or machine being controlled) is off (37), the load switch condition sensors are off (38). This is the desired condition of operation when the system first is started up. If the load switch condition (37) is on, the load switch condition sensors are on (39); and this provides an indication to the reset mode indicator in the unit 10 of load inoperable (40). This means the load switch must be placed in the off position in order that the load switch condition sensors turn off to permit the AC control circuit to turn on. Consequently, it is necessary to set the load switch to the off position (41).

If the EKS circuit breaker condition for the safety switch is closed (42), AC power potential is available (43) to apply power to the load through the EKS system. On the other hand, if the circuit breaker condition is open (42), the AC power potential is blocked (44) and the AC load is inoperable (45). This means that the circuit breaker must be set to the closed position (46) to cause AC power potential (43) again to be available.

If all of the foregoing conditions exist, that is the AC control circuit is on, AC power potential is available, and the load switch set to its off position, the EKS system is ready to control the load. This is indicated by a ready mode indicator on (50). At this time setting the load switch to its on position (51) normally turns the load on (53). The ready mode indicator (50) remains on at this time. For some applications, a brake circuit option also may be provided. With the load on (53) the brake circuit is ready (54) and if the interface switch is closed (56), the load continues to remain on unless an overload or incoming power loss occurs.

If the interface switch (56) briefly is opened the AC control circuit turns off (57) and the brake, if used, is activated (59). At the same time, the load switch condition sensors turn on (60) and power to the load is turned off (61) by way of the EKS unit. The reset mode indicator (40) turns on again; and all of the previously mentioned start-up conditions must be met before the EKS system reverts to its ready mode to permit the reapplication power to the load. In this case, turning the load switch to its off position (63) normally is all that is necessary before the EKS unit reverts back to its ready mode. The interface switch and EKS circuit breaker should be in the correct position although if for some reason they are not, the foregoing sequence of operation should be repeated.

Load off (64) refers to the unlikely case in which, with the start-up conditions met, the load does not operate when the load switch is set to on position (51). If this were to occur it would indicate a malfunction in the EKS or the load or both (65). Revert to a system check and control at (65) refers to either manual or automatic recheck of the system to ensure that previously mentioned start-up conditions have been met. In addition, if there is overload at the EKS circuit breaker (67) the load is turned off and is inoperable (45) until the foregoing sequence of start-up conditions is met. Incoming AC power loss (69) causes the EKS power to be turned off (70) and the load to be turned off (71). Subsequent restoration of AC power (72) turns the EKS power (73) on, but the load is not turned on until the foregoing sequence of turning off the load switch first has occurred.

From the foregoing, it can be seen that the functional sequence of operation of the EKS system is to operate solely as a "turn-off" switch. The EKS system is not used to turn on the load. Whenever the interface switch, which is the foot operated switch in the pad 20 shown in FIG. 1, is turned off and subsequently turned back on again, the power is not restored to the load until the load on/off switch is first turned from its on condition to its off condition and then back on again. The interface switch or remotely activated switch, whether it is a foot operated switch or some other type of switch such as a radio-controlled switch, voice-activated switch, or light-controlled switch, cannot be used to turn the load on. This is important from a safety standpoint, so that accidental application of power to the tool or machine cannot be effected by the interface switch operating condition.

Figure 3:
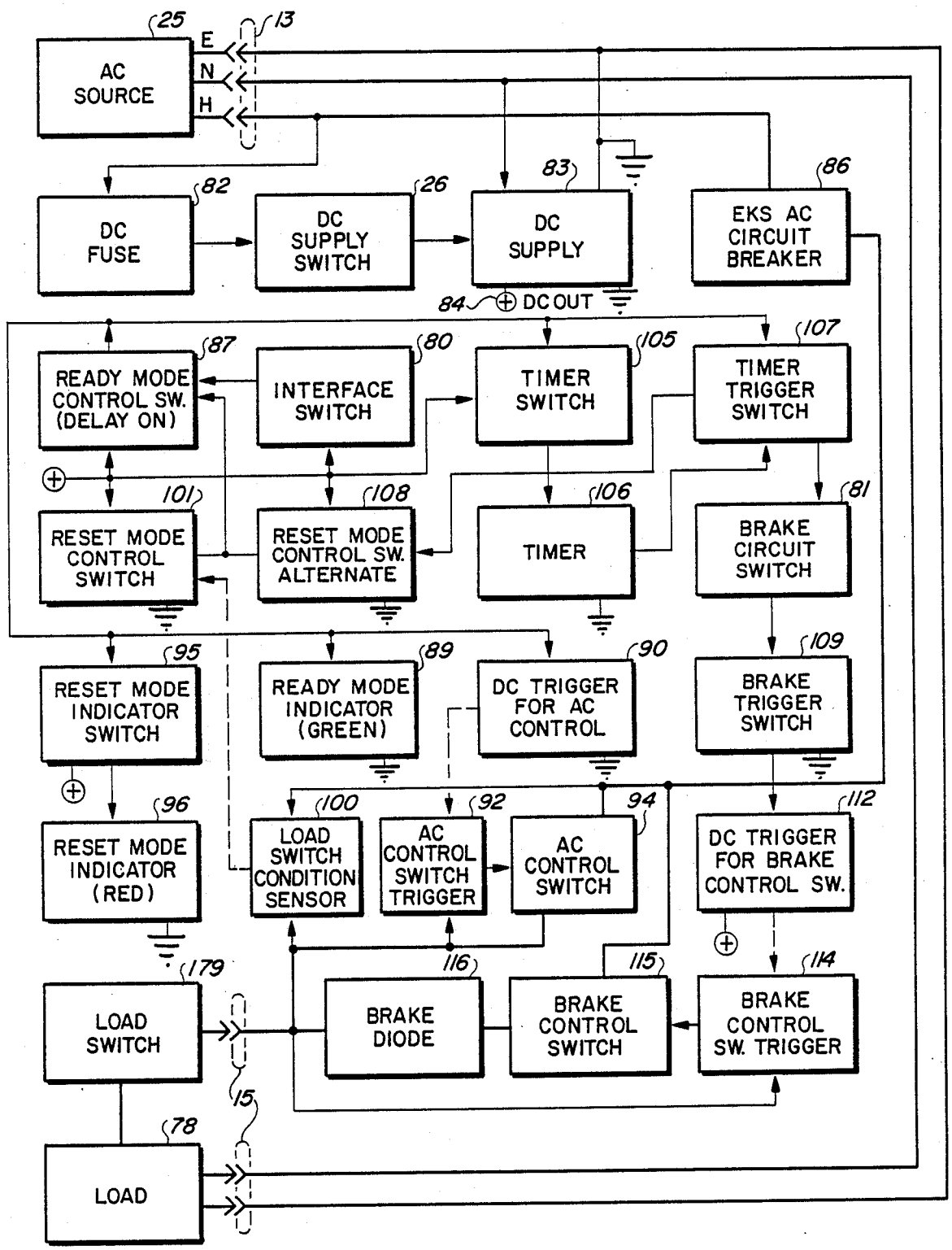
FIG. 3 is a block diagram of an electrical circuit for carrying out the functions of the flow diagram of FIG. 2.

Reference now should be made to FIG. 3, which is a block diagram of an electrical circuit for the EKS system, showing its interconnection between the AC source 25 and a load 78 through the on/off load switch 79 for that load. The EKS unit is connected through the plug 13 to a source of alternating current power 25. The load 78 then also is connected to the EKS unit through the plug 15 and the load switch 79. The load 78 is turned on through the load switch 79; but it can be turned off either through the on/off switch 79 or by way of a remote interface switch 80 which may be located in the foot pad 20 (FIG. 1).

Prior to commencement of operation, the load switch 79 normally is turned off as well as a DC supply switch 26 located on the front of the housing 10 for the EKS unit. In addition, a brake circuit switch 81 (if a brake circuit option is used) also is in its off or open condition. Since the supply of alternating current power to the load is controlled by the EKS system, there is no possibility of line potential being applied to the load 78 from the source 25 when the EKS power is off. The DC supply switch 26 is closed to turn on the EKS unit by supplying direct current (DC) operating power to the electronic circuitry of the EKS unit. When the switch 26 is closed, alternating current is supplied through a DC fuse 82 to the rectifier circuit of a DC supply unit 83, also supplied from the AC source 25 with the neutral and grounded inputs from the source. Direct current operating power then is provided from the supply unit 83 on an output terminal 84. As indicated in FIG. 3, this operating power is supplied to the various circuits which form the EKS system.

Generally, when the system is first turned on, the interface switch 80 is closed (its normal position). This switch is connected through a delay circuit 87 to provide a signal to the ready mode indicator 89. Typically this is in the form of a green light on the front panel of the housing 10 to indicate that the system is ready for operation. With the circuit 87 on, the timer switch 105 is on and supplies voltage to the timer 106. At the same time the output of the delay circuit 87 also is applied to a trigger circuit 90 which operates an AC control switch trigger 92 to turn on the main AC control switch 94 in the EKS unit. It is considered helpful to note that in the circuit diagrams of both FIGS. 3 and 4, the main alternating current lines are drawn in heavy lines whereas the direct current and low current AC interconnections of the EKS system circuitry are shown in lighter or thinner lines.

When the main AC control switch 94 is closed, current potential is available from the output of that switch to the load switch 79. It is to be noted that the switch 94 is placed in the "hot" lead from the AC source while the neutral and ground leads are connected directly to the load 78. The hot lead is connected to the load 78 through the load switch 79. In this condition, the EKS system now is in its ready mode and operation of the load 78 is possible. Application of power to the load then is effected by closing the load switch to its "on" position, and normal operation of the tool or machine comprising the load 78 takes place.

If, during the time the load is being operated through the closed or on condition of the load switch 79, the interface switch 80 is opened (such as by application or removal of the foot pressure on the pad 20 of FIG. 1), or if an open circuit appears in the line by operation of the AC circuit breaker 86 or for any other reason, the ready mode control switch 87 turns off and causes the DC trigger 90 to operate the AC control switch trigger 92 to open the AC control switch 94. As a consequence, AC line potential is not available to the load 78, irrespective of the position of the load switch 79.

If the interface switch 80 is opened during the ready mode with the load switch 79 off, the EKS unit is caused to invert to the interface reset mode (described previously in conjunction with FIG. 2) in which the control switch 87 is off, the ready mode indicator light 89 is off, and the AC control switch 94 is open or off, as described previously. At the same time, the timer switch 105 turns off; and the timer trigger switch 107 turns on and triggers the timer 106 to turn on the alternate switch 108 and to turn off the control switch 87 for a brief period of time. Also, the reset mode indicator switch 95 is operated to supply a signal to a reset mode indicator 96. As indicated in FIG. 3, this indicator typically is a red light mounted on the face of the front panel of the housing 10 to provide a ready indication of the condition of the EKS unit to the operator of the tool or machine constituting the load 78. With the load switch 79 still off, closure of the interface switch 80 and the discharge of the timer 106 causes reversal of the conditions of operation just mentioned, turning on the ready mode indicator 89 and turning off the indicator 96. The timer trigger switch 107 turns off and the timer switch 105 turns on and again turns on the timer 106. Once again the DC trigger 90 causes operation of the AC control switch trigger 92, which in turn closes or turns on the AC control switch 94. The unit then is ready to operate immediately when the interface reset mode reverts back to the ready mode.

If the load switch 79 now is turned on to operate the load 78; and the interface switch 80 is opened even momentarily, the system inverts to the switch reset mode. The control switch 87 turns off, immediately turning off the ready mode indicator light 89, and, through the circuits 90 and 92, opens or turns off the AC control switch 94. The reset mode indicator is turned on by means of the operation of the reset mode indicator switch 95. At the same time, the timer switch 105 turns off and the timer trigger switch 107 turns on, causing the timer 106 to pulse on and initiate the reset mode by briefly turning on the reset mode alternate switch 108 which briefly holds the switch 87 off. A load switch condition sensor 100 is used to sense the position or condition of the load switch 79 and if the switch 79 is closed, as it is for the example under consideration, the condition sensor 100 is turned on and this sensor is optically coupled to a reset mode control switch 101 to turn on the reset mode control switch 101. The output of this switch is connected to the ready mode control switch 87 and causes the switch 87 to remain off even if the interface switch 80 then is reclosed. This condition remains so long as the load switch 79 is in its closed or on condition.

If the load switch 79 now is opened or turned to its off condition, the load switch condition sensor 100 detects this condition and causes the reset mode control switch 101 to be opened. This in turn releases the ready mode control switch 87 and it is turned on if the interface switch 80 is in its on or closed condition. If this condition exists, switching the load switch 79 back to its on condition then permits the reapplication of power to the load 78, since the interface switch 80 operates through the ready mode control switch 87, circuit 90, and the circuit 92 to close or turn-on the AC control switch 94.

From the foregoing, it can be seen that the control circuitry operates only to turn off the power to the load in the event the safety switch, in the form of the interface switch 80, is depressed or opened during the time of operation of the load. Reclosure of the interface switch 80, even after a momentary interruption, is not capable of restarting the load until the sequence takes place of turning the load switch 79 to its off position and then back on again after the interface switch 80 is closed. This is an important safety feature, so that accidental restarting of the motor for the machine or tool comprising the load 78 cannot occur once it has been turned off through the safety interface switch 80. Switch reset must be corrected by means of the switching off of the load switch 79 before the ready mode condition of the system can occur.

A switch reset mode also occurs if the incoming AC line potential to the EKS unit is interrupted and then restored while the load switch 79 is on. Interruption of incoming alternating current can occur from a total or brief power failure at the AC source 25. Interruption can also occur from an overload of the AC source circuit breaker (not shown), overload at the EKS AC circuit breaker 86, EKS incoming power cord malfunction (unplugged or otherwise disconnected from the AC source) or EKS power switch 26 open (which turns off the DC operating power). In all of these situations, the AC control switch 94 is opened. If the load switch 79 is off when power is restored for any of these power interruptions, the EKS system will be back in its ready mode of operation (providing, of course, that the interface switch is closed). If, however, the load switch 79 remains in its on condition when power is restored, the switch reset mode of operation described previously exists and must be corrected by turning off the load switch 79 to cause the EKS unit to be placed back in its ready mode of operation (again assuming the switch 80 is closed).

The system of the foregoing description can be used for a wide variety of loads. If the EKS system, however, is controlling a load that is an AC motor capable of dynamic braking, a brake circuit also can be employed to enable the EKS system to stop the motor rotation simultaneously with the turning off of the power supply to the load 78 by opening the AC control switch 94.

If there is a brake for the load 78 the control of the brake is effected through the brake circuit switch 81. When the switch 81 is closed and the load switch 79 is closed and the load 78 is turned on (through the proper sequential operation of the EKS circuit as described previously), the motor brake is in the "ready" condition. If the load is turned off by way of the load switch 79, the brake is not activated. If, however, the load is turned off by means of the opening of the AC control switch 94 by opening the interface switch 80, the circuit inverts to the switch reset mode, at which time the timer switch 105 turns off and the timer trigger switch 107 turns on, activating the timer 106. The discharge from the timer 106, also briefly turns on the brake trigger switch 109. This turns on the direct current trigger switch 112, the output of which is optically coupled to a brake control switch trigger 114 to control a brake control switch 115 by causing the switch 115 to be triggered on for the duration of the output pulse of the timer 106. Normally the switch 115 is continuously in its off condition so that no AC current passes through it. During this brake control mode of operation, however, when the switch 115 is pulsed on, alternating current passes through the switch 115 to a brake diode 116 to allow passage of current pulses through the diode 116 in only one direction. This causes a pulse of direct current to be applied to the motor through the closed load switch 79, effectively halting the rotation of the motor in the load 78. If the load is off and the circuit is in the ready mode, with the brake switch 81 closed; and the switch 80 opened, the brake circuit will be activated but will be of no consequence since switches 87 and 79 both will be off.

Also controlled by the output of the timer 106 is the reset mode control switch alternate 108. The reset circuit 108 is turned on by the output pulse from the timer 106 and overrides the operation of the reset mode control switch 101 which is not stable during braking because of flucuations in the current flowing through the load switch condition sensor 100.

The load switch 79 may be opened or returned to its off position after or even during the braking action, and the circuit reverts back to its ready mode of operation provided, however, that the interface switch 80 is closed and the timer 106 is discharged. Once this is done, resumption of normal operation, commencing with the start-up conditions described previously may be resumed.

It should be noted that the motor brake operation and the circuitry for effecting this operation are not necessary in all applications. This is an option which may be used for some applications, if desired, where an AC motor capable of dynamic braking is used as the motor in the machine or tool constituting the load 78. Even if such a motor is used, the motor brake function is not necessary, but it can add an additional level of safety to the system to immediately stop the motor rotation in the event the interface switch 80 is opened during operation of the load.

Figure 4:
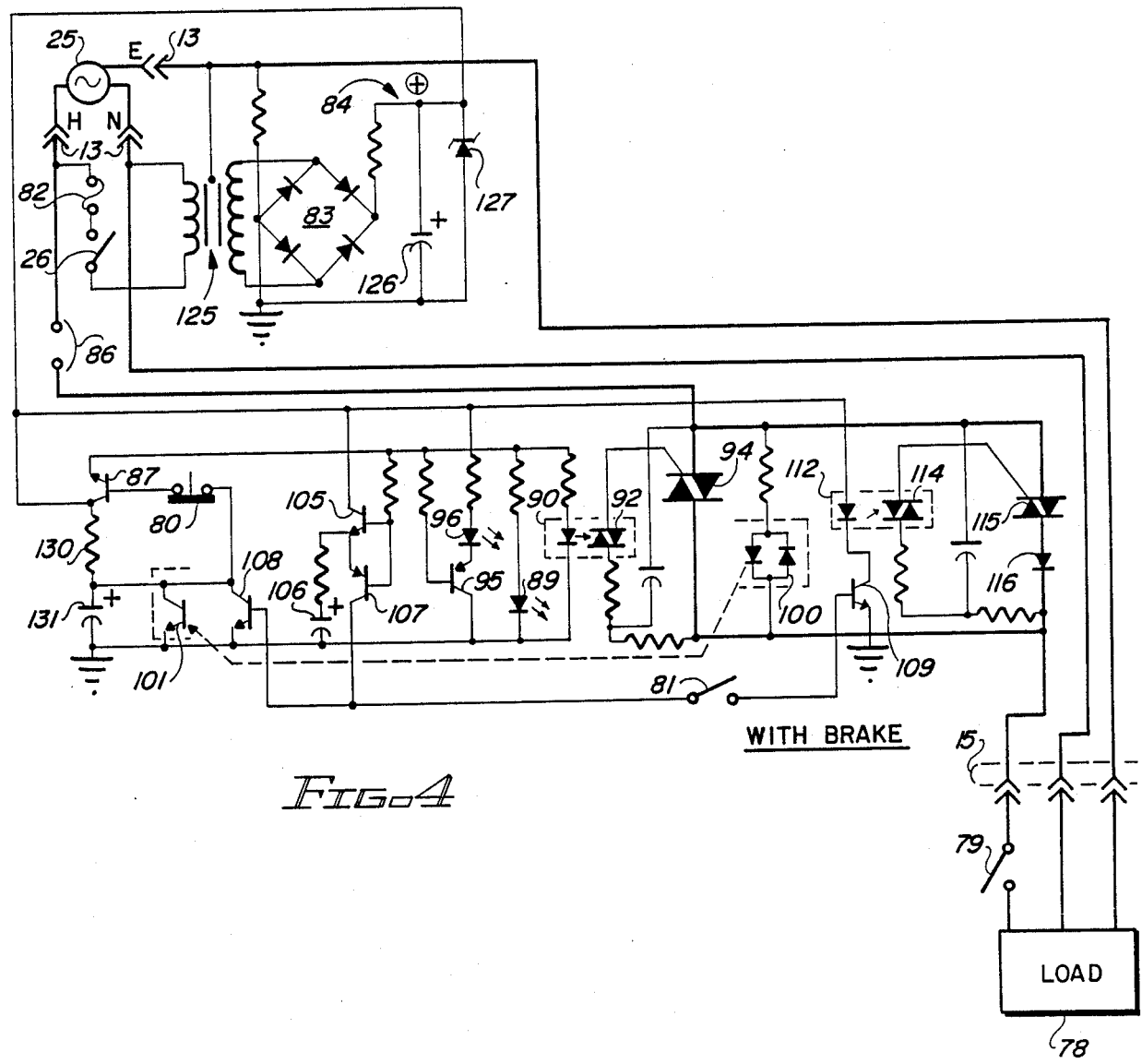
FIG. 4 is a detailed schematic diagram of the circuit illustrated in FIG. 3.

FIG. 4 is a detailed schematic diagram of the circuit shown in block diagram form in FIG. 3. The various components of FIG. 4 which are illustrated in FIG. 3 have been given the same reference numbers, so that correlation of the circuitry of FIG. 4 with that of FIG. 3 may be made. As in FIG. 3, the main alternating current leads are shown in heavy lines in FIG. 4, whereas the leads for direct current and low current AC circuitry in the EKS system are illustrated in thinner lines.

When the DC supply switch 26 is closed, alternating current is applied to the primary winding of a transformer 125, the secondary winding of which is connected to a full-wave rectifier 83 which supplies the direct current operating voltage at its output on the terminal 84 across a ripple capacitor 126 and a voltage regulating Zener diode 127. If the interface switch 80 is closed at the time the DC supply switch 26 initially is closed, a forward biasing operating potential for the ready mode control switch transistor 87 is applied from the junction of a resistor 130 and a capacitor 131. These components provide the time delay function described previously in conjunction with FIG. 3. After the capacitor 131 is charged, the resistor 130 acts as a dropping resistor for the NPN transistor switch 87.

When the charge on the capacitor 131 is sufficiently high to forward bias the transistor 87, it conducts and applies a reverse bias potential to the base of a PNP transistor 95 to bias the transistor 95 off. At the same time, the current through the emitter of the transistor 87 flows through the ready mode indicator diode 89 (green) to provide an indication that the circuit is ready. The NPN transistor 105 is biased on and supplies voltage to charge the capacitor 106. The PNP transistor 107 is biased off and the capacitor remains charged.

Also, the light emitting diode 90 which comprises the DC trigger for the alternating current control is activated. This diode is optically coupled to a light responsive AC control switch trigger 92 to apply a trigger pulse to the solid state AC switch 94 to render the switch 94 conductive.

It is readily apparent that at any time when the switch 79 is closed and the interface switch 80 is closed in the proper sequence, subsequent opening of the interface switch 80 causes the base of the ready mode control switch transistor 87 to be open circuited thereby rendering the transistor 87 non-conductive. This immediately removes the operating current through the DC trigger control diode 90, causing the AC control switch trigger 92 to be non-conductive opening the solid state AC switch 94. The power then is removed from the load. The load sensing switch 100 in the form of back-to-back connected light-emitting diodes which normally are shunted by the switch 94 so that the switch 100 is inoperative, then conducts current. The diodes of the switch 100 are optically coupled to the base of an optical NPN transistor 101. The transistor 101 then is rendered conductive to place an essential short circuit across the capacitor 131 to discharge the capacitor 131. The resistor in series with the switch 100 is very large, so that insufficient current flows through the switch 100 to operate the load 78.

If the on/off switch 79 for the load 78 then is opened, no longer is any AC current permitted to flow through the switch 100 and it becomes non-conductive. As a consequence no light is furnished by the back-to-back diodes of the switch 100 and the transistor 101 once again becomes non-conductive. This permits the time delay compacitor 131 to charge in the manner described previously. If the switch 80 then is closed and the switch 79 subsequently is closed, the initial conditions for applying power to the load 78 are met. In this condition of operation, the AC switch 94 effectively again operates as a short circuit across the back-to-back light emitting diodes 100; and they are non-conductive until such time as the switch 94 once again is rendered non-conductive and the switch 79 is closed.

When the transistor 87 is turned off the transister 105 is biased off and the transistor 107 is biased on, allowing the capacitor 106 to discharge and turn on the transistor 108. This discharges the capacitor 131 in a manner similar to the manner of operation of the transistor switch 101. However, the transistor 108 remains on for only a brief period and very quickly starts the reset mode for the switch 101, which is purposely slow to avoid false triggering by any momentary voltage changes at the diodes 100. The switch 108 overrides major fluxuations of the transistor 101 caused by the diodes 100 to prevent the capacitor 131 from becoming charged during the brake control operation of the circuit when that option is employed.

When the brake switch 81 is closed and the load 78 is turned off by opening the interface switch 80, the previously described discharge of the timing capacitor 106 now briefly turns on the transistor 108, the transistor 109, and the light emitting diode 112 which is optically coupled to a light responsive trigger switch 114. The switch 114, in turn, is connected to the gate of a solid state switch 115 to render the switch 115 conductive. Alternating current applied to the switch 115 is rectified by a diode 116 to apply the previously described DC brake plulses to the load 78 through the closed switch 79 when the brake option is used.

The foregoing description of the preferred embodiment of the invention is to be considered illustrative of the invention and not as limiting. Various changes and modifications will occur to those skilled in the art. For example, the interface switch 80 is shown and described as a normally closed single- pole, single-throw momentary switch. A normally open single-throw, momentary switch could be substituted to act as a "dead-man's" switch and deactivate the operating load by way of an AC power control circuit upon release to an open position. Obvious circuit modifications would be made to the detailed circuit of FIG. 4 to accomplish this. Also combinations of normally closed and normally open switches could be employed in place of the single switch 80 which has been illustrated. Also, for example a single pole double throw (SPDT) momentary switch with the normally closed (NC) contacts and the normally open (NO) contacts connected together could be used at 80 to provide the capability of utilizing the foot switch as a "kick" switch (load off by application of pressure) or as a "dead-man's" switch (load off by release of pressure). The circuit in FIG. 4 is entirely capable of reacting to the short open duration of a switch such as this.

The interface switch 80 which has been described as a foot operated switch, could be replaced or supplemented by an alternate remote interface control such as VOX (voice operated control), infrared control, pneumatic control, etc. Combinations of series or parallel connected remote interface control switches could be used if desired to provide additional degrees of safety and/or operational security.

Where specific circuitry in the form of optically coupled switches and the like have been used, different types of electronic or electromechanical circuitry may be employed without departing from the scope of the invention. Different circuit modifications may be utilized to permit the braking action to occur after the switch 80 is opened and then reclosed. Also, the braking action can be modified to cause motor braking to occur either through the operation of the interface switch 80, as described, or upon opening of the circuit to the load by means of the on/off switch 79 if desired. Additionally, it may be desirable to accomplish the motor braking action by DC application through a capacitor discharge system or even by attempting motor reversal in some cases. It may also be desirable to add a pulse generator to the brake circuit to create more than one brake pulse.

In addition, the load switch 79 has been shown in the alternating current hot line, but this switch also could be used to open the neutral line as well, or both lines if desired. These are but a few of the different modifications which may be made to the circuit without departing from the scope of the invention.

I claim:

1. A safety switch system for an electrically operated device having on/off switch means with an on position and an off position for respectively connecting and disconnecting such device from a source of electric current through a power cord, including in combination:

a source of relatively high voltage electric current;

means coupled with said source of relatively high voltage electric current for providing relatively low voltage power;

an electronic switch having a control input and connected in series between said source of relatively high voltage electric current and said power cord for said on/off switch means for controlling the application of current from said source of relatively high voltage electric current to said power cord in response to control signals applied to the control input thereof;

reset means coupled with said low voltage power means for operation thereby and responsive to the condition of operation of said on/off switch means and further coupled to the control input of said electronic switch for preventing the resupplying of current from said source of relatively high voltage electric current to said power cord through said electronic switch until said on/off switch means first is operated from its off position to its on position;

safety switch means including a cut-off switch having first and second states of operation, coupled between said means for providing relatively low voltage power and the control input of said electronic switch for applying said control signals to the control input of said electronic switch; and means coupled to said reset means for operating said reset means to prevent the resupplying of current from said source of relatively high voltage electric current to said power cord following a temporary loss of power from said source of relatively high voltage electric current to prevent operation of said device until said on/off switch means is turned off and then back on with said cut-off switch in a predetermined one of its first and second states of operation.

2. The combination according to claim 1 wherein said electrically operated device is an electrical power tool.

3. The combination according to claim 2 wherein said electrical power tool is a stationary power tool.

4. The combination according to claim 1 further including means coupled with said system for providing a visual display of the status of operation of said system.

5. The combination according to claim 1 wherein said electrically operated device comprises an electric motor, and further including brake means coupled with said safety switch means and operated with said electronic switch in the first state of operation thereof and said on/off switch in the on position thereof for stopping rotation of said motor.

6. The combination according to claim 1 wherein said cut-off switch comprises a foot-operated switch.

7. The combination according to claim 6 where in said electrically operated device comprises an electric motor, and further including brake means coupled with said safety switch means and operated with said electronic switch in the first state of operation thereof and said on/off switch in the on position thereof for stopping rotation of said motor.

* * * * *